United States Patent
Watson et al.

(10) Patent No.: US 10,635,939 B2
(45) Date of Patent: Apr. 28, 2020

(54) SYSTEM, METHOD, AND COMPUTER-ACCESSIBLE MEDIUM FOR EVALUATING MULTI-DIMENSIONAL SYNTHETIC DATA USING INTEGRATED VARIANTS ANALYSIS

(71) Applicant: Capital One Services, LLC, McLean, VA (US)

(72) Inventors: Mark Watson, Urbana, IL (US); Fardin Abdi Taghi Abad, Champaign, IL (US); Anh Truong, Champaign, IL (US); Kenneth Taylor, Champaign, IL (US); Reza Farivar, Champaign, IL (US); Jeremy Goodsitt, Champaign, IL (US); Austin Walters, Savoy, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/152,072

(22) Filed: Oct. 4, 2018

(65) Prior Publication Data

US 2020/0012891 A1 Jan. 9, 2020

Related U.S. Application Data

(60) Provisional application No. 62/694,968, filed on Jul. 6, 2018.

(51) Int. Cl.
*G06K 9/62* (2006.01)
*G06F 16/906* (2019.01)
(Continued)

(52) U.S. Cl.
CPC ......... *G06K 9/6257* (2013.01); *G06F 16/906* (2019.01); *G06F 17/5009* (2013.01);
(Continued)

(58) Field of Classification Search
CPC .... G06K 9/6257; G06K 9/036; G06K 9/6231; G06K 9/6265; G06F 16/906; G06F 17/5009
See application file for complete search history.

(56) References Cited

U.S. PATENT DOCUMENTS 10,275,867 B1 * 4/2019 Pathapati ........... G06K 9/00483
10,303,771 B1 * 5/2019 Jezewski ................ G06N 20/00
(Continued)

OTHER PUBLICATIONS del Carmen Rodriguez-Hernandez, Maria, Sergio Ilarri, Ramon Hermoso, and Raquel Trillo-Lado. "DataGenCARS: A generator of synthetic data for the evaluation of context-aware recommendation systems." Pervasive and Mobile Computing38 (2017): 516-541. (Year: 2017).*

(Continued)

*Primary Examiner* — Rehana Perveen
*Assistant Examiner* — Chuen-Meei Gan
(74) *Attorney, Agent, or Firm* — Hunton Andrews Kurth LLP

(57) ABSTRACT

An exemplary system, method, and computer-accessible medium can include, for example, receiving an original dataset(s), receiving a synthetic dataset(s), training a model(s) using the original dataset(s) and the synthetic dataset(s), and evaluating the synthetic dataset(s) based on the training of the model(s). The model(s) can include a first model and a second model, and the first model can be trained using the original dataset(s) and the second model can be trained using the synthetic dataset(s). The synthetic dataset(s) can be evaluated by comparing first results from the training of the first model to second results from the training of the second model.

20 Claims, 12 Drawing Sheets

(51) Int. Cl.
  *G06K 9/03* (2006.01)
  *G06F 17/50* (2006.01)
(52) U.S. Cl.
  CPC ........... *G06K 9/036* (2013.01); *G06K 9/6231* (2013.01); *G06K 9/6265* (2013.01)

(56) References Cited

U.S. PATENT DOCUMENTS

| | | | | |
|---|---|---|---|---|
| 2003/0172043 | A1* | 9/2003 | Guyon | G06K 9/6231 706/48 |
| 2013/0304783 | A1* | 11/2013 | Fontes | G06F 17/18 708/300 |
| 2016/0062820 | A1* | 3/2016 | Jones | G06K 9/6265 714/37 |
| 2018/0165475 | A1* | 6/2018 | Veeramachaneni | G06F 16/00 |

OTHER PUBLICATIONS

Lee, Joo Ho, In Yong Kim, and Christine M. O'Keefe. "On regression-tree-based synthetic data methods for business data." Journal of Privacy and Confidentiality 5, No. 1 (2013). (Year: 2013).*

Kopemiak, S., "Artificial Data give the Same Results as Real Data—without Compromising Privacy", MIT News; 3 pages, 2017; Retrieved on May 23, 2018 from https://news.mit.edu/2017/artificial-data-give-same-results-as-real-data-0303.

Soneson, C., et al., "Towards Unified Quality Verification of Synthetic Count Data with countsimQC", Bioinformatics; vol. 34, Issue 4, pp. 691-692, (2018); Retrieved on May 23, 2018 from https://academic/oup.com/bioinformatics/article/34/4/691/4345646.

Wiig, D., "Using R: Random Sample Selection and One-Way ANOVA", R Statistics and Programming; 5 pages, (2015); Retrieved on May 23, 2018 from https://dmwiig.net/2015/08/07/using-r-to-analyze-norc-gss-data-random-sample-selection-and-one-way-anova-2/.

Westphal, S., "Using Synthetic Data for Deep Learning Video Recognition", 8 pages, Retrieved on May 23, 2018 from https://medium.com/twentybn/using-synthetic-data-for-deep-learning-video-recognition-49be108a9346.

Benedetti, M., "The Advantages and Limitations of Synthetic Data", The Samasource Blog, 3 pages, Retrieved on May 23, 2018 from https://www.samasource.org/single-post/2018/01/24/The-advantages-and-limitations-of-synthetic-data.

Priyadarshi, H. et al., "Analysis of variance, normal quantile-quantile correlation and effective expression support of pooled expression ratio of reference genes for defining expression stability", Heliyon, (2017) 15 pages, Retrieved on May 30, 2018 from https://www.ncbi.nlm.nih.gov/pmc/articles/PMC5247286.

Garrow, L. et al., "Generation of Synthetic Datasets for Discrete Choice Analysis", SpringerLink (2010) vol. 37, Issue 2, v. 183-202, Retrieved on May 30, 2018 from https:link.springer.com/article/10.1007%2Fs11116-009-9228-6.

Nonnemarker, J., "The Safe Use of Synthetic Data in Classification", Lehigh University—Dissertation Presented for Candidacy for Doctor of Philosophy Degree (2008) 272 pages.

Domingo-Ferrer, J. et al., "ESSNET-SDC Deliverable Report on Synthetic Data Files", Universitat Rovira i Virgili & Institute for Employment Research, (2009) 32 pages.

\* cited by examiner

Original data:

Synthetic data:

Real Data

Synthetic Data

SYSTEM, METHOD, AND COMPUTER-ACCESSIBLE MEDIUM FOR EVALUATING MULTI-DIMENSIONAL SYNTHETIC DATA USING INTEGRATED VARIANTS ANALYSIS

CROSS-REFERENCE TO RELATED APPLICATION(S)

This application relates to and claims priority from U.S. Patent Application No. 62/694,968, filed on Jul. 6, 2018, the entire disclosure of which is incorporated herein by reference. This application also relates to U.S. patent application Ser. Nos. 16/151,385, 16/151,407, and 16/151,431, all of which were filed on Oct. 4, 2018, the entire disclosures of which are also incorporated herein by reference

FIELD OF THE DISCLOSURE

The present disclosure relates generally to synthetic datasets, and more specifically, to exemplary embodiments of an exemplary system, method, and computer-accessible medium for evaluating a synthetic dataset.

BACKGROUND INFORMATION

Customer behavior modeling is the creation of a mathematical model to represent the common behaviors observed among particular groups of customers in order to predict how similar customers will behave under similar circumstances. Models are typically based on data mining of customer data, and each model can be designed to answer one or more questions at one or more particular periods in time. For example, a customer model can be used to predict what a particular group of customers will do in response to a particular marketing action. If the model is sound and the marketer follows the recommendations it generated, then the marketer will observe that a majority of the customers in the group respond as predicted by the model.

While behavior modeling is a beneficial tool, access to data can present a significant hurdle in training the model. In particular, models need large datasets in order to be properly trained. Only after a model is properly trained can the model be applied. Previously, models were trained on datasets that include information regarding actual people. These models, generally referred to as original datasets, include real information about real people, including biographical, demographic, and even financial information about the people in the dataset. Much of this information can be sensitive information, and even though the data in the original dataset can be anonymized, the use of original datasets has significant privacy implications.

An example of an original dataset can include customer information for a bank or financial institution. The dataset can include bank account information, types of transactions, asset portfolios, income etc. This information is extremely sensitive, and can be compartmentalized within an institution (e.g., only certain people or groups have access to the dataset) or subject to other usage restrictions. In order to overcome the privacy concerns associated with original datasets, synthetic datasets can be used. Synthetic datasets can include computer generated customer information, which can then be used to train a model. However, generating a dataset that can successfully be used to train a model is difficult, and many synthetic datasets are not suitable for model training.

Thus, it may be beneficial to provide a system, method, and computer-accessible medium for evaluating a synthetic dataset which can overcome at least some of the deficiencies described herein above.

SUMMARY OF EXEMPLARY EMBODIMENTS

An exemplary system, method, and computer-accessible medium can include, for example, receiving an original dataset(s), receiving a synthetic dataset(s), training a model(s) using the original dataset(s) and the synthetic dataset(s), and evaluating the synthetic dataset(s) based on the training of the model(s). The model(s) can include a first model and a second model, and the first model can be trained using the original dataset(s) and the second model can be trained using the synthetic dataset(s). The synthetic dataset(s) can be evaluated by comparing first results from the training of the first model to second results from the training of the second model.

In some exemplary embodiments of the present disclosure, the first results can be compared to the second results using an analysis of variance procedure. The first results can be compared to the second results using a threshold procedure. The threshold procedure can include summing first errors from the first results, summing second errors from the second results, and comparing the summed first errors to the summed second errors. The summed first errors can be compared to the summed second errors using a threshold criterion. The threshold procedure can include determining a statistical correlation based on a plurality of covariance matrices.

In some exemplary embodiments of the present disclosure, the first model can be equivalent to the second model. The model(s) can be a classification model. The synthetic dataset(s) can be generated, for example, based on the original dataset(s). A further synthetic dataset(s) can be generated based on (i) the synthetic dataset(s) and the evaluation of the synthetic dataset(s). The original dataset(s) and the synthetic dataset(s) can include (i) biographical information regarding a plurality of customers or financial information regarding the plurality of customers.

Additionally, an exemplary system, method and computer-accessible medium for evaluating a synthetic dataset(s) can include receiving an original dataset(s), generating a synthetic dataset based on the original dataset(s), training a first model(s) using the original dataset(s), training a second model(s) using the synthetic dataset(s), and evaluating the synthetic dataset(s) based on the training of the first model(s) and the training of the second model(s). A further synthetic dataset(s) can be generated based on the evaluation and the synthetic dataset(s). The second model(s) can be trained based on the further synthetic dataset(s). The further synthetic dataset(s) can be evaluated based on the training of the second model(s) on the further synthetic dataset(s).

Further, an exemplary system, method and computer-accessible medium can include receiving an original dataset(s), receiving a synthetic dataset(s) related to the original dataset(s), training a first model(s) using the original dataset(s), training a second model(s) using the synthetic dataset(s), comparing first results from the training of the first model to second results from the training of the second model, modifying the synthetic dataset(s) based on the comparison, and repeating some or all of the above procedures until the comparison of the first results to the second results is less than a particular threshold. The first results can be compared with the second results using an analysis of variance procedure.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Original datasets can present significant privacy concerns for the owner of the original dataset, as well as the people who have information contained within the original dataset. However, the real-world information contained within an original dataset is beneficial for use in various models, including modeling behavior of people similar to those contained within a dataset. Due to this privacy concern, original datasets are generally compartmentalized such that only a limited number of people have access to the original dataset. The exemplary system, method, and computer-accessible medium, however, can use the original dataset to generate a synthetic dataset for use in training various generated models.

The exemplary system, method and computer-accessible medium, according to an exemplary embodiment of the present disclosure, can be used to generate a synthetic dataset for comparison to an original dataset, which can be modified, as needed, such that results obtained using the synthetic dataset can be similar to results obtained using an original dataset. The generated synthetic dataset can include computer generated customer information, which can then be used to train a model. However, generating a dataset that can successfully be used to train a model is difficult, and many synthetic datasets are not suitable for model training.

Figure 1:
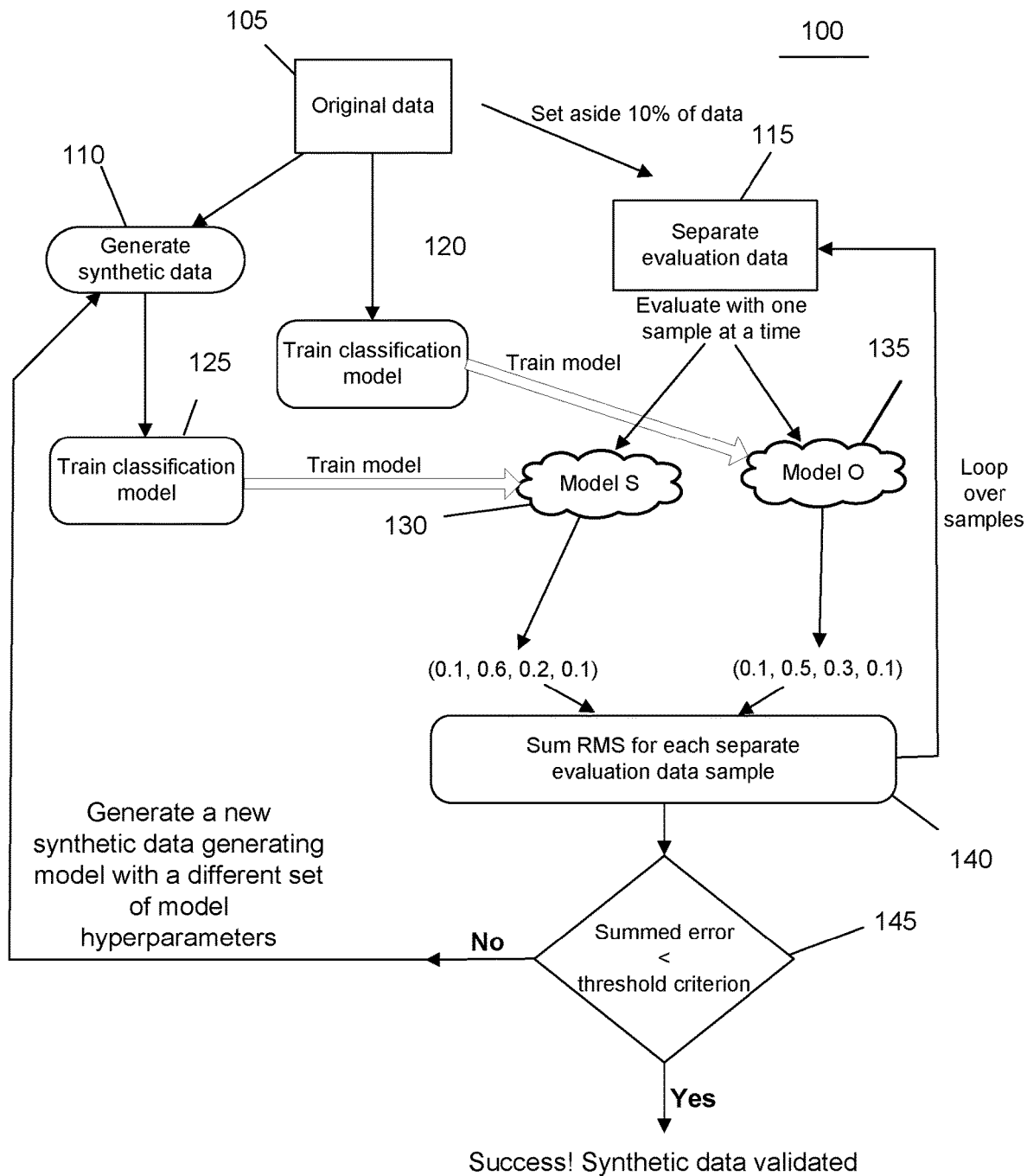
FIG. 1 is a flow diagram of a method for evaluating a synthetic dataset according to an exemplary embodiment of the present disclosure.

FIG. 1 shows a flow diagram of a method 100 for evaluating a synthetic dataset according to an exemplary embodiment of the present disclosure. For example, original data/dataset 105 can be generated or received. The original data 105 can include various sensitive and/or private customer information including, but not limited to, name, address, phone number, email address, bank account information, investment account information, spending information, transaction information, etc. Original data 105 can include all customer information that a company has for a customer, or original data 105 can include a subset of customer information. Original data 105 can depend on the model to be trained (e.g., the subset of customer information can be chosen depending on what a person or a company intends to model). Since original data 105 includes sensitive/private customer information, companies may not want to give broad/general access to original data 105 when training various models. Thus, the exemplary system, method and computer-accessible medium can be used to generate a synthetic dataset for use as a replacement for original data 105.

Prior to original data 105 being used to train a classification model at procedure 120, a subset of original data 105 can be set aside for use later in method 100. For example, separate evaluation data 115 can be used on the trained models described below in order to evaluate the trained models. Separate evaluation data 115 can be a random sample taken from original data 105. Alternatively, a user can choose specific data to include in separate evaluation data 115.

Synthetic data 110 can include customer information similar to the information contained in original data 105. For example, if original data 105 contains names, addresses, phone numbers, and email addresses for real customers, then synthetic data 110 can also contain names addresses, phone numbers, and email addresses for fictitious customers. Synthetic data 110 can include randomly generated information similar to the information contained within original data 105. Alternatively, or in addition, the exemplary system, method and computer-accessible medium can use publically available information (e.g., real addresses not associated with a particular customer) in order to generate synthetic data 110. For example, biographical information can be obtained from maps of cities (e.g., New York City) for use in generating synthetic data 110. Further, a combination of random and non-random generated information can be used. For example, phone numbers, email addresses, transaction information, and account information can be randomly generated, but certain biographical information (e.g., addresses) can be generated based on real information.

Original data 105 can be used to train a classification model at procedure 120. This training can be performed either before or after synthetic data 110 has been generated. The classification model can be any suitable classification model (e.g., a behavior classification model), and can depend on the type of information contained within original data 105. At procedure 125, a classification model can be trained using synthetic data 110. This classification model can be any suitable classification model (e.g., a behavior classification model), and can depend on the type of information contained within synthetic data 110. The classification model trained at procedure 125 can be the same classification model trained at procedure 120. Alternatively, the classification model trained at procedure 125 can be different than the classification model trained at procedure 120. In some exemplary embodiments of the present disclosure, the classification model trained at procedure 125 can be an exact copy of the classification model trained at procedure 120, or the classification model trained at procedure 125 can be based on the classification model trained at procedure 120 but modified depending on the contents of synthetic data 110.

The results of the training of the classification model at procedure 120 can be trained original data model 135 (e.g., based on original data 105). The results of the training of the classification model at procedure 125 can be trained synthetic data model 130 (e.g., bases on synthetic data 110). After both synthetic data model and original data model have been trained (e.g., using either original data 105 or synthetic data 110), the models can be applied to separate evaluation data 115, which was obtained from original data 105. The results of the application of separate evaluation data 115 to synthetic data model and original data model can be compared to one another using various exemplary comparison procedures. For example, as discussed below, an integrated variants analysis procedure, or an analysis of variance ("ANOVA") procedure can be used to compare the results from training models using original data 105 and synthetic data 110. Other suitable comparison procedures can be used including a threshold procedure and a sum of squares procedure.

For example, at procedure 140, the probability distributions from the results of applying separate evaluation data 115 to synthetic data model 130 and original data model 135 can be calculated using an ANOVA, and the root mean square ("RMS") can be summed for each separate evaluation data sample. FIG. 1 illustrates four features used for comparison, however any suitable number of features can be used, which can depend on the data contained within original data 105 and synthetic data 110, and/or the amount of data contained within original data 105 and synthetic data 110. At procedure 145, an evaluation of the synthetic dataset can be made to determine if the results obtained using the synthetic data 110 sufficiently match the results obtained using original data 105. Sufficiency can be based on a threshold criterion. For example a determination can be made at procedure 145 as to whether the summed error is less than a threshold criterion. If the summed error is less than the threshold criterion, then the results obtained using synthetic data 110 can sufficiently match the results obtained using original data 105. If not, then the statistical correlation of the synthetic data 110 (e.g., based on a plurality of covariance matrices) may not be sufficient for training a model to be used in production. In some exemplary embodiments of the present disclosure, a user can evaluate the results from procedure 140 to determine if synthetic data 110 is sufficient.

Additionally, a resulting error based on synthetic data model and original data model can be used to determine the sufficiency of synthetic data 110. For example, the error can be the square of the difference between the original data and the synthetic data. The square of the differences can be summed, and then the sufficiency can be based on whether or not this sum exceeds a particular number.

If synthetic data 110 is determined to not be sufficient at procedure 145, then synthetic data 110 can be modified (e.g., a new synthetic dataset can be generated, for example, based on a different or modified set of model hyperparameters). Modifications can be based on user input (e.g., a user can add or remove certain variables and/or information contained with synthetic data 110). Alternatively, a computer can be used to automatically remove certain variables/ information from synthetic data 110. For example, parameters in synthetic data 110 can be randomly modified. After synthetic data 110 has been modified, the classification model can be trained at procedure 125 based on the modified synthetic data 110. The results of the training (e.g., synthetic data model) can be compared (e.g., at procedure 140) to the original results obtained by training a model using original data 105 (e.g., original data model). Then, at procedure 145, a further determination can be made as to whether the trained model based on the modified synthetic data is sufficient. If it is determined to be sufficient, then method 100 can end. If the modified synthetic data is determined to still not be sufficient, then further modifications can be made to the synthetic data. The procedures in method 100 can be repeated until the results of training a model using synthetic data 110 is determined to be a sufficient match to the results obtained from training a model using original data 105.

As discussed above, the comparison performed in method 100 can be based on an ANOVA. An ANOVA can be a collection of statistical models and their associated estimation procedures the variation among and between groups) used to analyze the differences among group means in a sample. Using an ANOVA, the exemplary system, method and computer-accessible medium can observe variances in a particular variable, which can be partitioned into components attributable to different sources of variation. The ANOVA can provide a statistical test of whether the population means of several groups (e.g., original data 105 and synthetic data 110) can be equal, and therefore generalizes, for example, a t-test to more than two groups. The exemplary system, method and computer-accessible medium can use the ANOVA for comparing (e.g., testing) three or more group means for statistical significance.

The exemplary system, method and computer-accessible medium, according to an exemplary embodiment of the present disclosure, can utilize an ANOVA, which can include a divisor (e.g., the degrees of freedom ("DF")), and a summation (e.g., called the sum of squares ("SS")), the result of which can be a mean square ("MS") where the squared terms can be deviations from the sample mean. The exemplary system, method and computer-accessible medium can utilize an ANOVA to estimate three sample variances: (i) a total variance based on all the observation deviations from the grand mean, (ii) an error variance based on all the observation deviations from their appropriate treatment means, and (iii) a treatment variance. The treatment variance can be based on the deviations of treatment means from the grand mean, the result being multiplied by the number of observations in each treatment to account for the difference between the variance of observations and the variance of means.

The exemplary system, method and computer-accessible medium, according to an exemplary embodiment of the present disclosure, can partition the total SS into components related to the effects used in the exemplary model. The number of DFs can be partitioned in a similar manner. For example, one of these components (e.g., for error) can specify a chi-squared distribution which can describe the associated sum of squares, while the same can be true for "treatments" if there is no treatment effect. An F-test can be used to compare the factors of the total deviation.

The exemplary system, method and computer-accessible medium, according to an exemplary embodiment of the present disclosure, can utilize two procedures for concluding an ANOVA. For example, the observed value of F can be compared with the critical value of F determined from a table. The critical value of F can be a function of the DF of the numerator and the denominator and the significance level ($\alpha$). Thus, if F≥FCritical, the null hypothesis can be rejected. Alternatively, the probability (e.g., p-value) of a value of F greater than or equal to the observed value can be calculated. The null hypothesis can be rejected if this probability can be less than or equal to the significance level ($\alpha$).

The ANOVA F-test can be used to minimize false negative errors for a fixed rate of false positive errors (e.g., maximizing power for a fixed significance level). For example, to test the hypothesis that various medical treatments have exactly the same effect, the F-test's p-values can closely approximate the permutation test's p-values: The approximation can be particularly close when the design is balanced. Such permutation tests can characterize a test with maximum power against all alternative hypotheses. The ANOVA F-test can be robust against many alternative distributions.

The ANOVA can include separable parts: (i) partitioning sources of variance and (ii) hypothesis testing, which can be used individually. The ANOVA can be used to support other statistical tools which can be used to compare the results obtained using the synthetic data to the results obtained using original data. A regression can be used to fit more complex models to data, and then the ANOVA can be used to compare models with the objective of selecting simple(r) models that adequately describe the data. Such models can be fit without any reference to ANOVA, but ANOVA tools can be used to make some sense of the fitted models, and to test hypotheses about batches of coefficients.

Tables 1 and 2 illustrate comparison of integrated variants using the Wisconsin Cancer Data Set. For example, as shown below, clump thickness for a benign sample resulted in a weighting for the original data of −21 while the weighting for the synthesized data was −9. However, for the malignant sample, the weighting for clump thickness in the original data was 21 and for the synthesized data it was 31. Thus, clump thickness can have a high importance in determining whether something is malignant, but may not be important for determining if something is benign, and a comparison of the original data to the synthesized data shows agreement between the two models.

TABLE 1

Contributions to classification for sample type benign sample

|  | Original Data | Synthesized Data |
|---|---|---|
| Clump Thickness | −21 | −9 |
| Uniformity of Cell Size | 42 | 54 |
| Uniformity of Cell Shape | −18 | −25 |
| Marginal Adhesion | 4 | 15 |
| Single Epithelial Cell Size | −73 | −57 |
| Bare Nuclei | 37 | 64 |
| Bland Chromatin | −58 | −34 |
| Normal Nucleoli | 10 | 21 |
| Mitoses | 17 | 32 |

TABLE 2

Contributions to classification for sample type malignant sample

|  | Original Data | Synthesized Data |
|---|---|---|
| Clump Thickness | 21 | 31 |
| Uniformity of Cell Size | 8 | 12 |
| Uniformity of Cell Shape | 15 | 9 |
| Marginal Adhesion | −21 | −18 |

TABLE 2-continued

Contributions to classification for sample type malignant sample

|  | Original Data | Synthesized Data |
|---|---|---|
| Single Epithelial Cell Size | −8 | −2 |
| Bare Nuclei | 90 | 84 |
| Bland Chromatin | 20 | 11 |
| Normal Nucleoli | 17 | 19 |
| Mitoses | 3 | 4 |

Exemplary Evaluation of Generated Data

The exemplary system, method, and computer-accessible medium, according to an exemplary embodiment of the present disclosure, can provide multiple functionalities for users to evaluate data that has been generated. Based on resultant evaluation scores and data visualization, the exemplary system, method, and computer-accessible medium can provide suggestions as to whether the synthetic generated data is safe or adequate (e.g. accurate and sufficiently non-sensitive) to use, and/or put a warning or even a red flag if the synthetic data potentially contains similar information from the original data.

Exemplary Statistical Correlation

Figure 2:
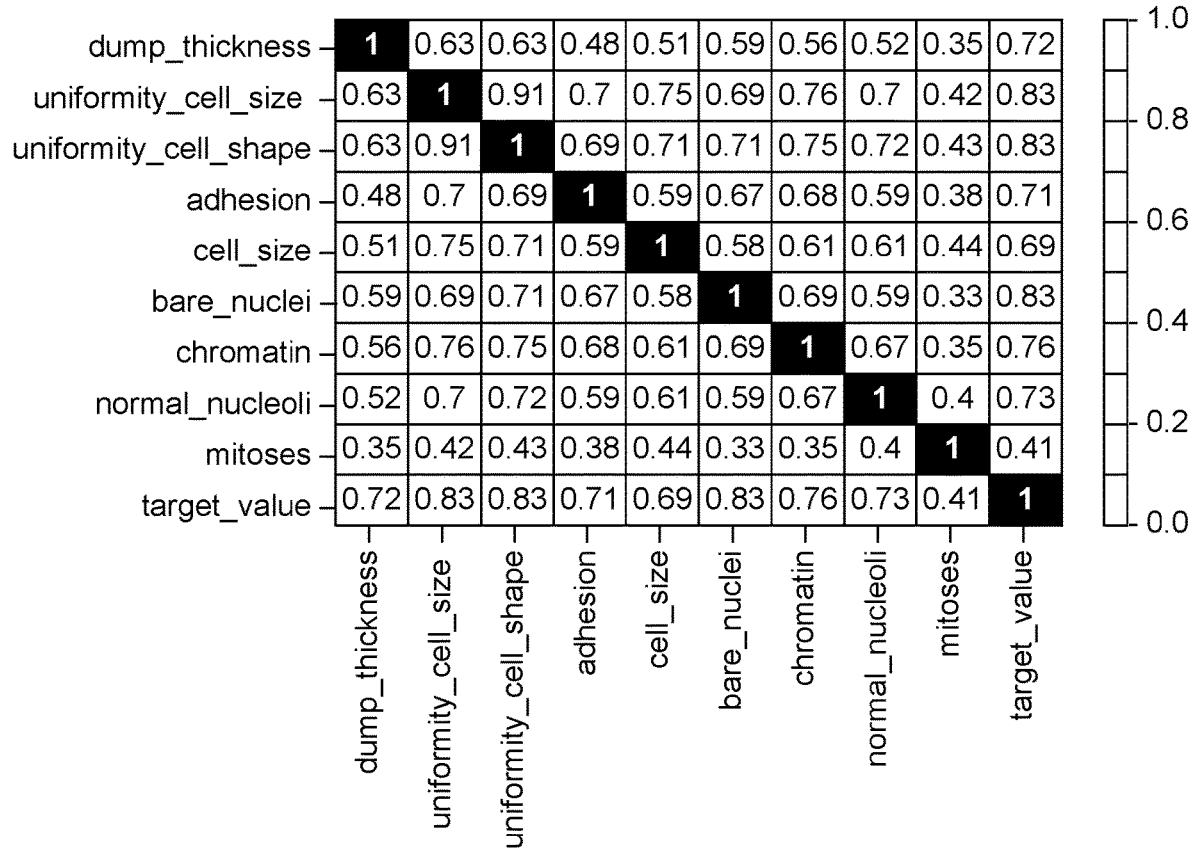
FIG. 2 is an exemplary diagram of an exemplary covariance matrix according to an exemplary embodiment of the present disclosure.
Figure 3:
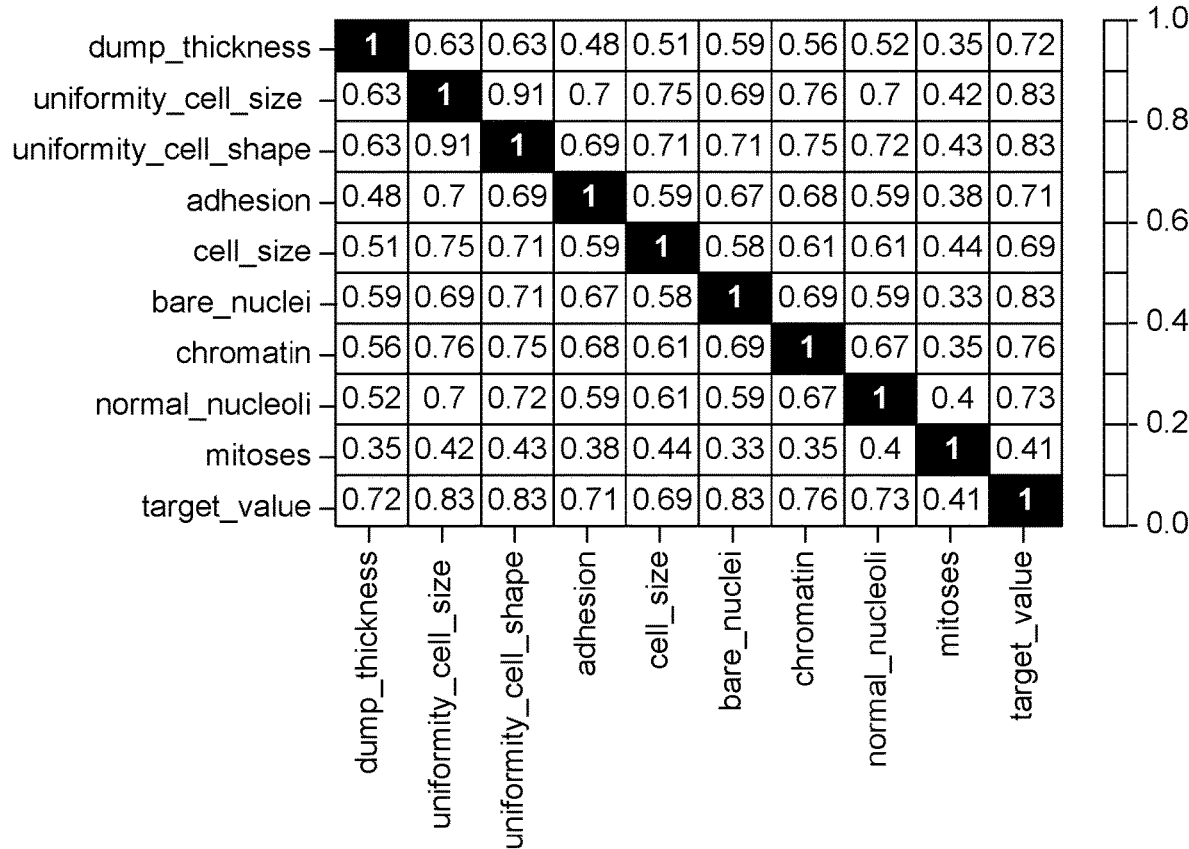
FIG. 3 is an exemplary diagram of a further exemplary covariance matrix according to an exemplary embodiment of the present disclosure.

The statistical correlation measures how much the synthetic data is correlated with the original data. FIGS. 2 and 3 are exemplary diagrams of exemplary covariance matrices according to an exemplary embodiment of the present disclosure. The Covariance matrix shows the correlation between features in a dataset. If the covariance matrices of the original data and synthetic data look similar, the synthetic data is considered as preserving the correlation (e.g., relation to), from the original data. The exemplary system, method, and computer-accessible medium can provide a normalized difference score of covariance matrices and covariance matrix visualization.

For numerical fields, a covariance matrix can provide a reasonable sense of correlation between values. The correlation difference score can be used to determine the total difference of two covariance matrices.

Exemplary Univariate Distribution

A univariate distribution can show the distribution of values for each column in a dataset. In the exemplary system, method, and computer-accessible medium, a univariate distribution score can be calculated by the average of total variation of two distributions for all columns in the two datasets. If the univariate-distribution difference score is small, the synthetic data is considered as preserving the correlation from the original data. The exemplary system, method, and computer-accessible medium can provide a difference score of univariate distribution and graph comparison for it.

Figure 4A:
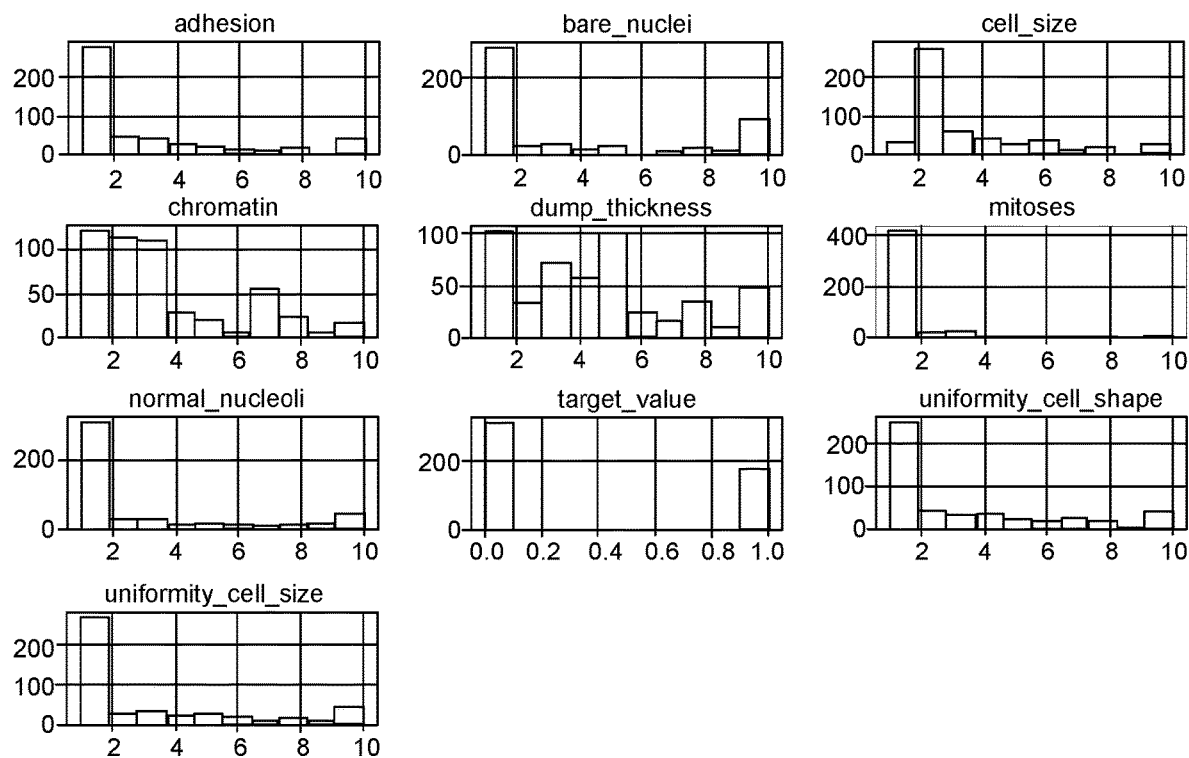
FIGS. 4A and 4B are exemplary graphs of univariate distribution scores for original and synthetic data according to an exemplary embodiment of the present disclosure.
Figure 4B:
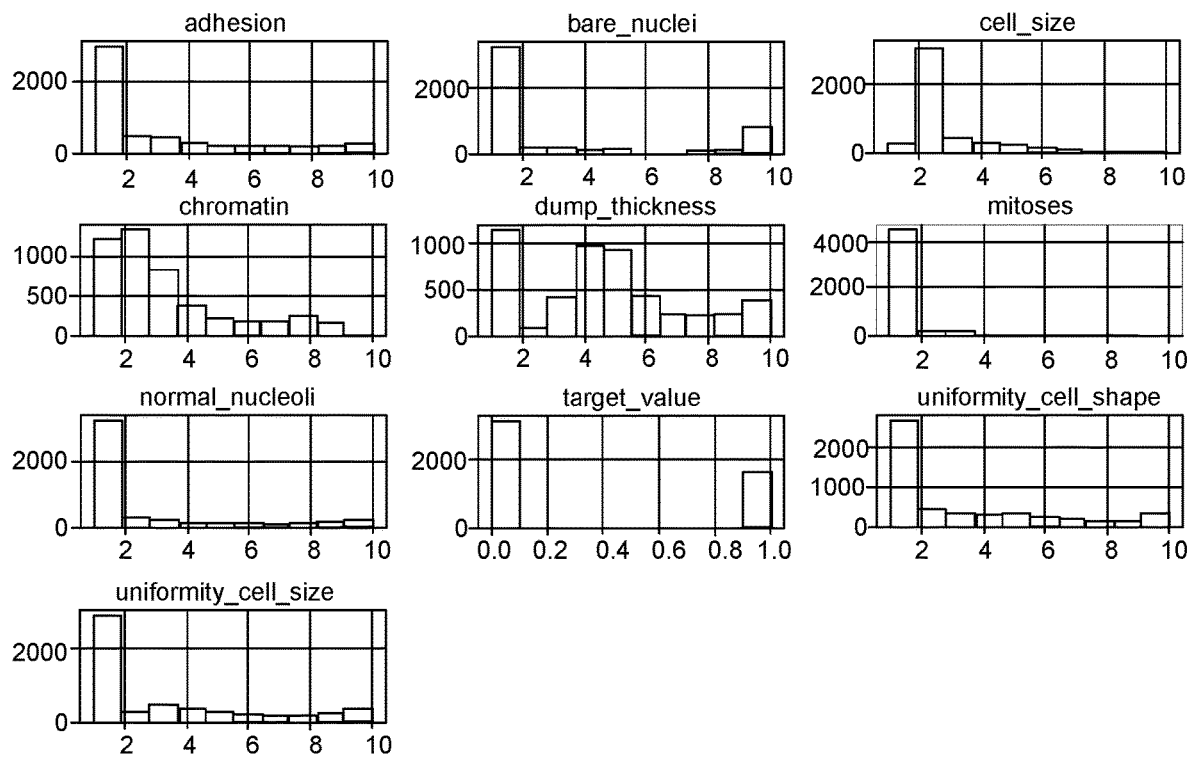

The univariate distribution plots illustrate the distribution of the values for all the columns in the original and synthetic data. (see e.g., FIGS. 4A and 4B).

Exemplary Univariate-Distribution Difference Score

The univariate distribution difference score can be used by the exemplary system, method, and computer-accessible medium to compare the difference of univariate distributions of common columns from two data frames. For each column, it can be used to apply a total variation to compare distributions. The lower the score, the more similar univariate distribution two datasets have.

Exemplary Cross-Frequency for Categorical Values

Figure 5A:
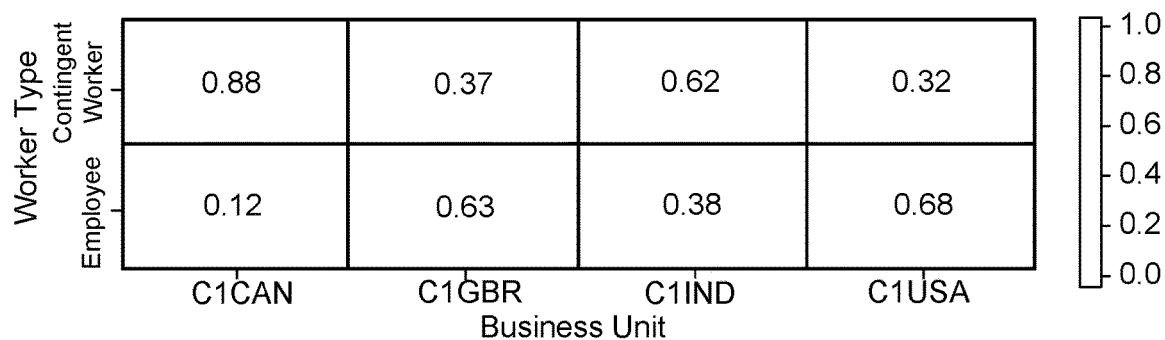
FIGS. 5A and 5B are exemplary diagrams of data similarity between original data and synthetic data according to an exemplary embodiment of the present disclosure.
Figure 5B:
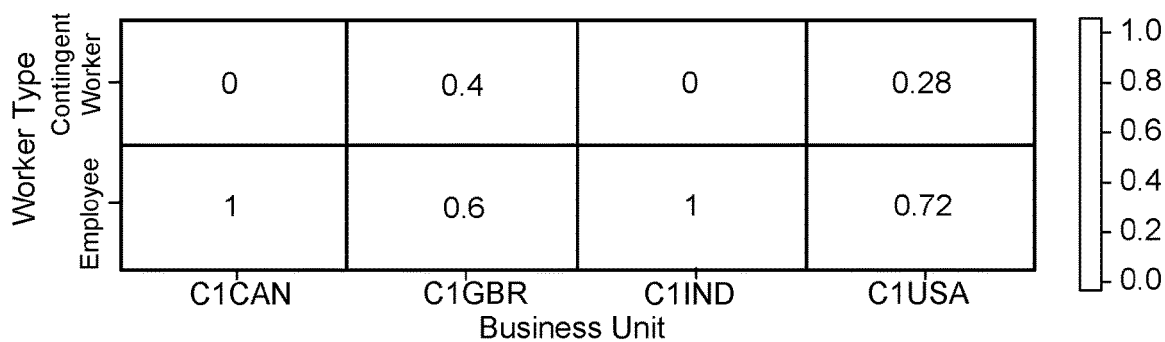

The exemplary system, method, and computer-accessible medium, according to an exemplary embodiment of the present disclosure, can also be used to better understand the quality of generated data vs. original data for categorical columns using the frequency of various categories appearing with each other. (See e.g., FIGS. 5A and 5B).

Exemplary Data Similarity

The data similarity evaluation measures how much the synthetic data is similar to the original data. Exact-match row overlap can be used to calculate the number of exact overlap rows between two datasets. It can also be used to calculate the ratio of row overlap for each data, which can be equal to the ratio of number of row overlap and total number of rows in each dataset. If this metric score is low enough, it can imply that the exemplary system, method, and computer-accessible medium's models can generalize the data structure and regenerate samples.

Exemplary Fuzzy-Match Row Overlap

Fuzzy-match row overlap can be used to measure how close the rows in the synthetic data are to the original data. It can be used to provide a more detailed level of the above overlap calculation. For example, given two rows in two datasets are not exactly matched, if they differ at one column over ten columns, these rows are still considered as similar enough. Thus, it can provide the maximum distance of any two rows from two datasets, the average closest distance of any two rows from two datasets, and the distance score calculated from them. The lower this metric score is, the more similar the two datasets are.

The data quality evaluation can measure how good the synthetic data is compared to the original data (e.g., how well the synthetic data matches the original data). Row-duplicate evaluation can be used to measure the number of row duplicates in each dataset and its corresponding ratio over the sample sizes. The lower this metric score is, the synthetic data gains better quality in terms of not repeating the same row for many times. Repeated-value evaluation can be used to measure the maximum number of repeated values across all columns in the data. The lower this metric score is, the synthetic data gains better quality in terms of not repeating the same value in a certain column for many times.

Exemplary Percentage of Overlap Values in Columns

The percentage of overlap values in columns can be used by the exemplary system, method, and computer-accessible medium to measure the percentage of overlap values, in each column, between synthetic and real data. For example, after generating the synthetic data, it can be beneficial to see what is the percentage of values in a specific column is in the real data. Another beneficial evaluation case is to check the preservation of the rare values (e.g., defined by values with frequency less than 10% of the whole column). This can provide an evaluation of how well the model can reflect the infrequent values.

Exemplary Schema Preservation

Schema-preservation evaluation can be used to measure the schema match between the synthetic data and the original data. Specifically, the exemplary system, method, and computer-accessible medium can check if there is any column of the synthetic data that is not in the original data, the number of column type mismatches, the number of category mismatches, and the number of numeric-range mismatches. With lower metric scores, the synthetic data gains better quality in terms of having schema similar to that of the original data.

The evaluation function can be used to evaluate scores and calculate combined scores for different criteria. The statistical correlation score can include a combined score of features correlation and univariate distribution difference score. A data similarity score can include a combined score of exact-match overlap score and fuzzy-match overlap score. A data quality score can include a combined score of row-duplicate score, repeated-value score and schema-preservation score. Based on these calculated scores, the exemplary system, method, and computer-accessible medium can provide suggestions on how the users should use the data. There are three regions the synthetic data can fall into:

1) Normal region: the synthetic data brings some level of correlation, similarity of the original data, matches well with the original schema, and does not generate too many row or value duplicates.
2) Warning region: the synthetic data can potentially bring high level of correlation or similarity of the original level that can cause the data leak. Also, if the synthetic data has fairly poor quality in terms of not matching the schema with the original data, providing many duplicated rows and values, it also falls into this region. The exemplary system, method, and computer-accessible medium can put a warning of using data for those cases and offers suggestions to resolve the issues. If the users want the synthetic data to reflect less correlation or similarity from the original data, they can change the models' parameters to make them perform worse (e.g., by decreasing number of layers in GAN models, or reducing the number of iterations). If the users want the synthetic data to have better quality, they can change the model's parameters to make them perform better (e.g., by increasing number of layers in GAN models, or leveraging the number of iterations).
3) Red flag region: the synthetic data is likely to bring high level of correlation or similarity of the original level that may cause the data leak. Also, if the synthetic data has very poor quality in terms of not matching the schema with the original data, providing many duplicated rows and values, it can also fall into this region. The exemplary system, method, and computer-accessible medium can put a red flag of using data for those cases and offer suggestions to resolve the issues. If the users want the synthetic data to reflect less correlation or similarity from the original data, they can change the models' parameters to make them perform worse (e.g., by decreasing number of layers in GAN models, or reducing the number of iterations). If the users want the synthetic data to have better quality, they can change the model's parameters to make them perform better (e.g., by increasing number of layers in GAN models, or leveraging the number of iterations).

Figure 6:
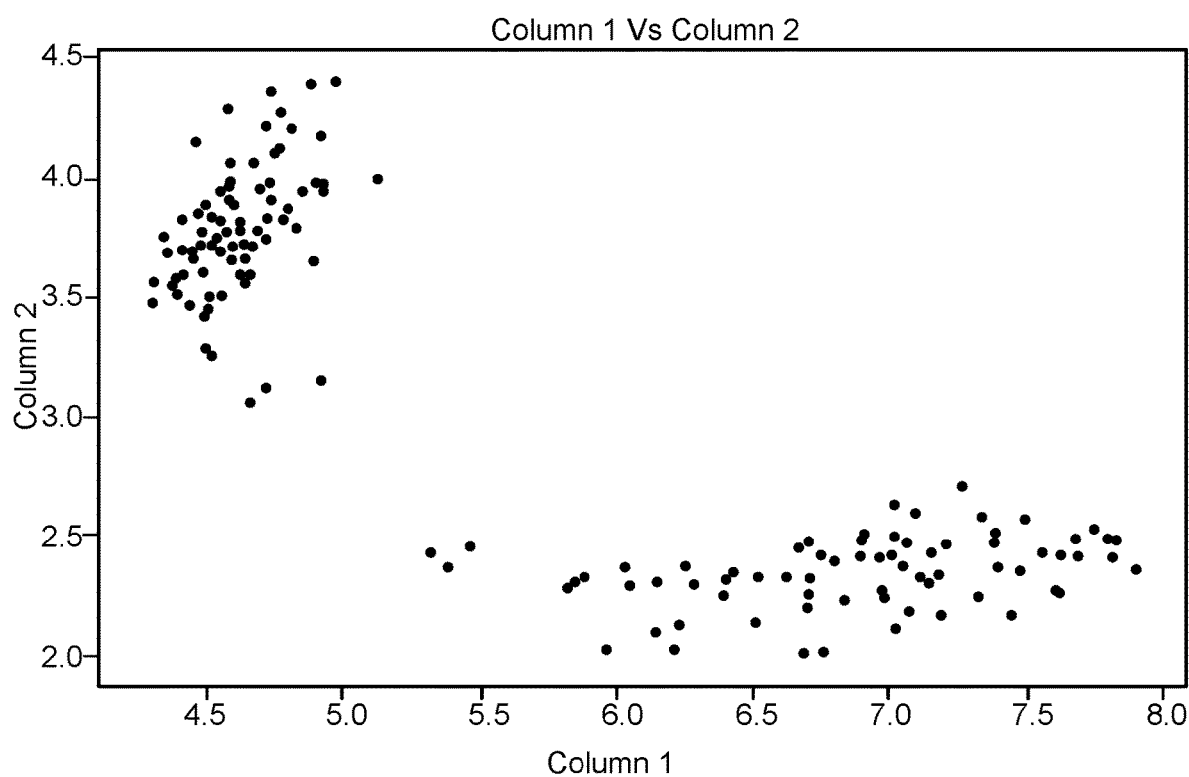
FIG. 6 is an exemplary graph of the dependence between one column and a label column according to an exemplary embodiment of the present disclosure.
Figure 7:
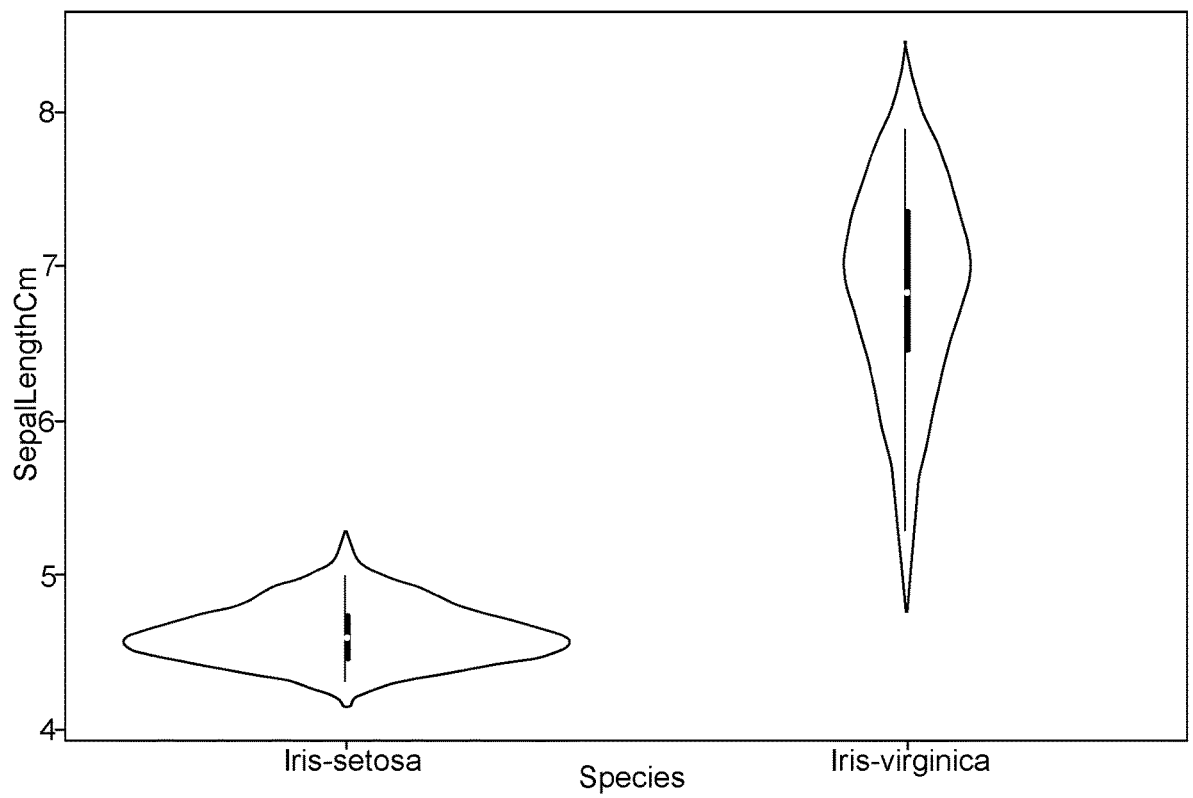
FIG. 7 is an exemplary graph of Sepail Length v species according to an exemplary embodiment of the present disclosure.

Other evaluation tools can also be used. For example, in addition to above evaluation metrics, the exemplary system, method, and computer-accessible medium can provide some plot functions in order to help users visualize the data comparison. For example, comparison plots and pairwise dependency plots can be used. These can be used to plot the dependence between two numerical columns. (See e.g., FIGS. 6 and 7).

Exemplary Prediction Accuracy Check

The exemplary system, method, and computer-accessible medium can be used to evaluate tools to help developers and data analysts check if they can build some predictive models on the synthetic data. In order to use the synthetic data generated, the data should guarantee (e.g., within some safe gap) the prediction accuracy that the predictive algorithms can obtain from the original data.

Figure 8:
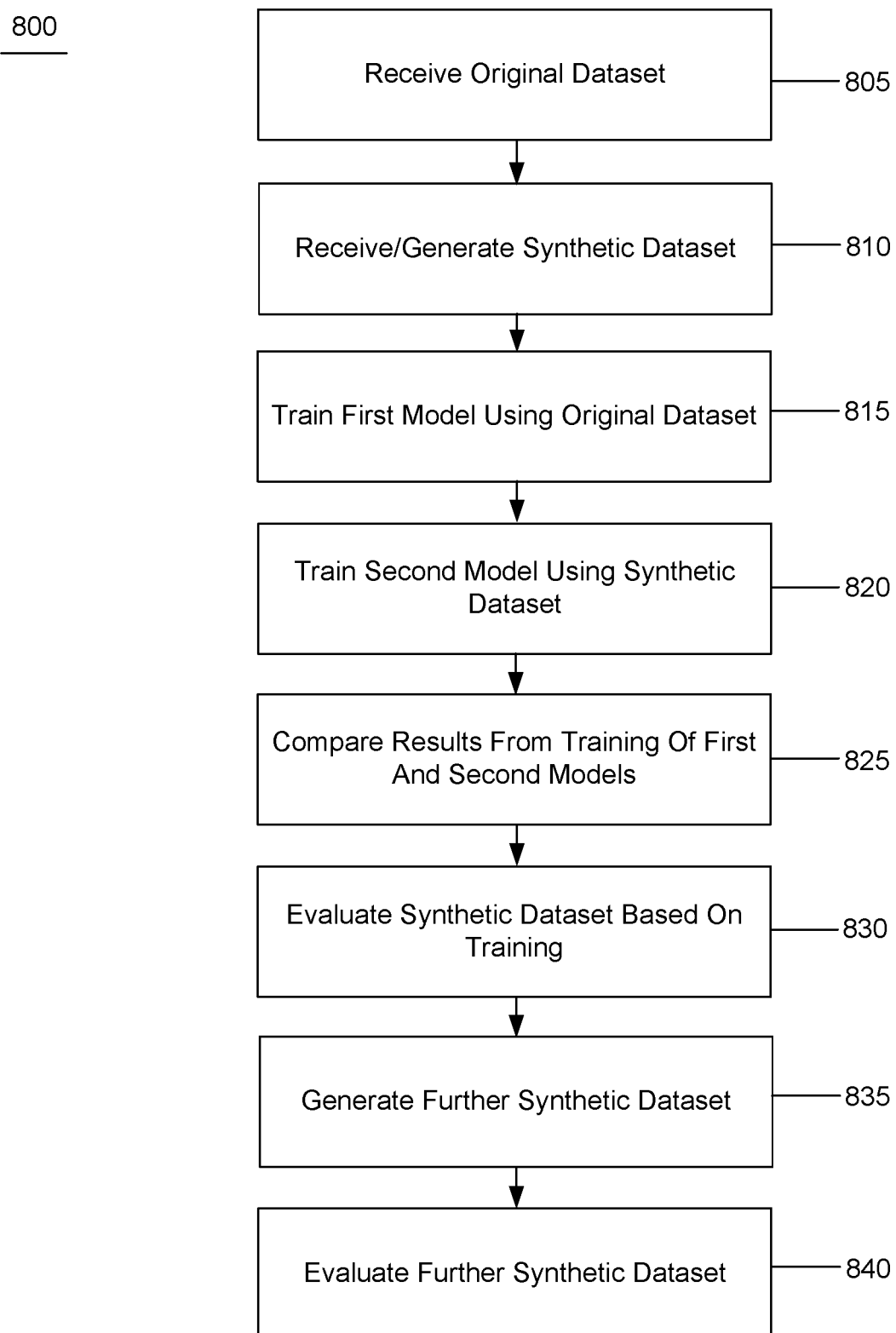
FIGS. 8-10 are exemplary flow diagrams of further methods for evaluating a synthetic dataset according to an exemplary embodiment of the present disclosure.
Figure 9:
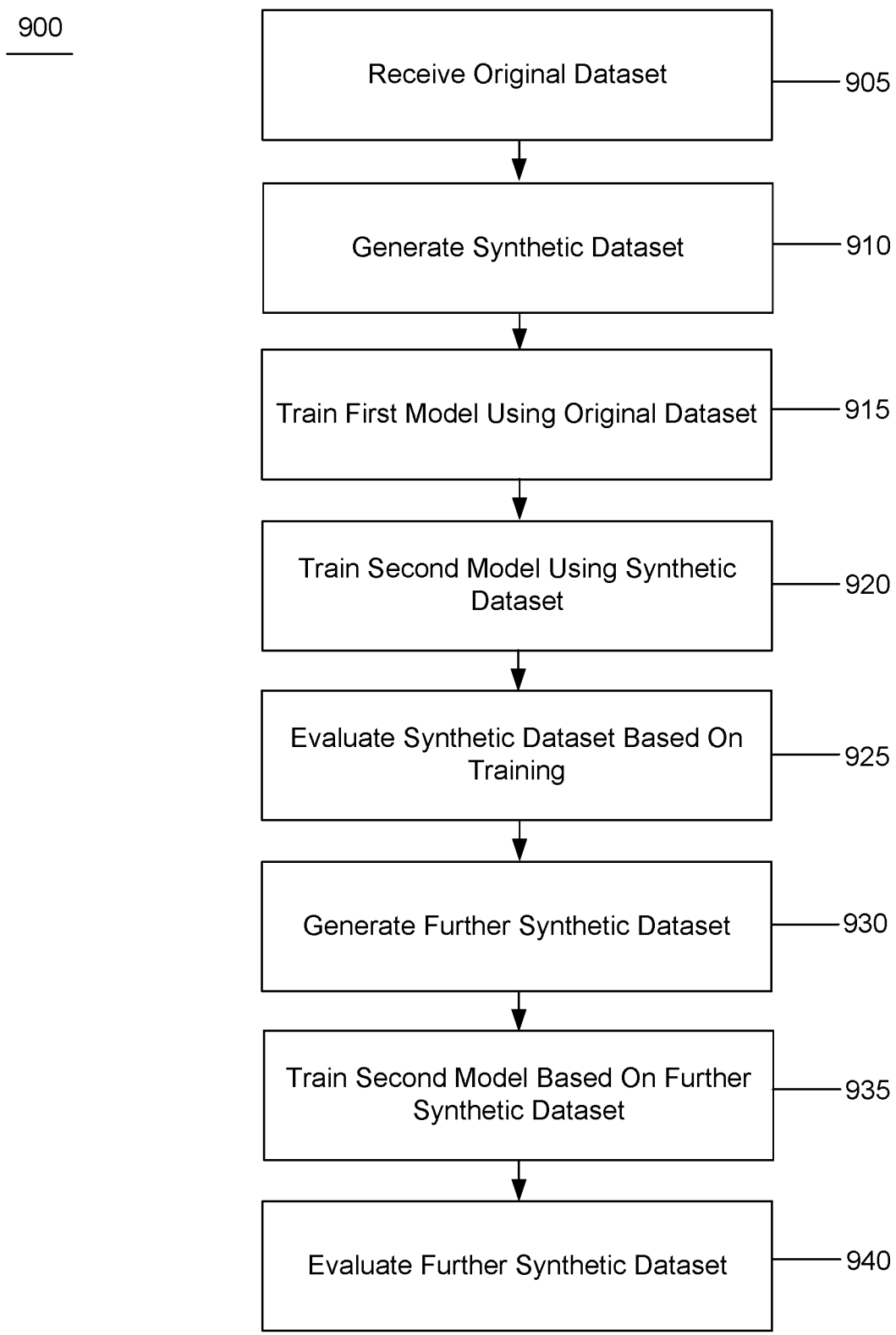
Figure 10:
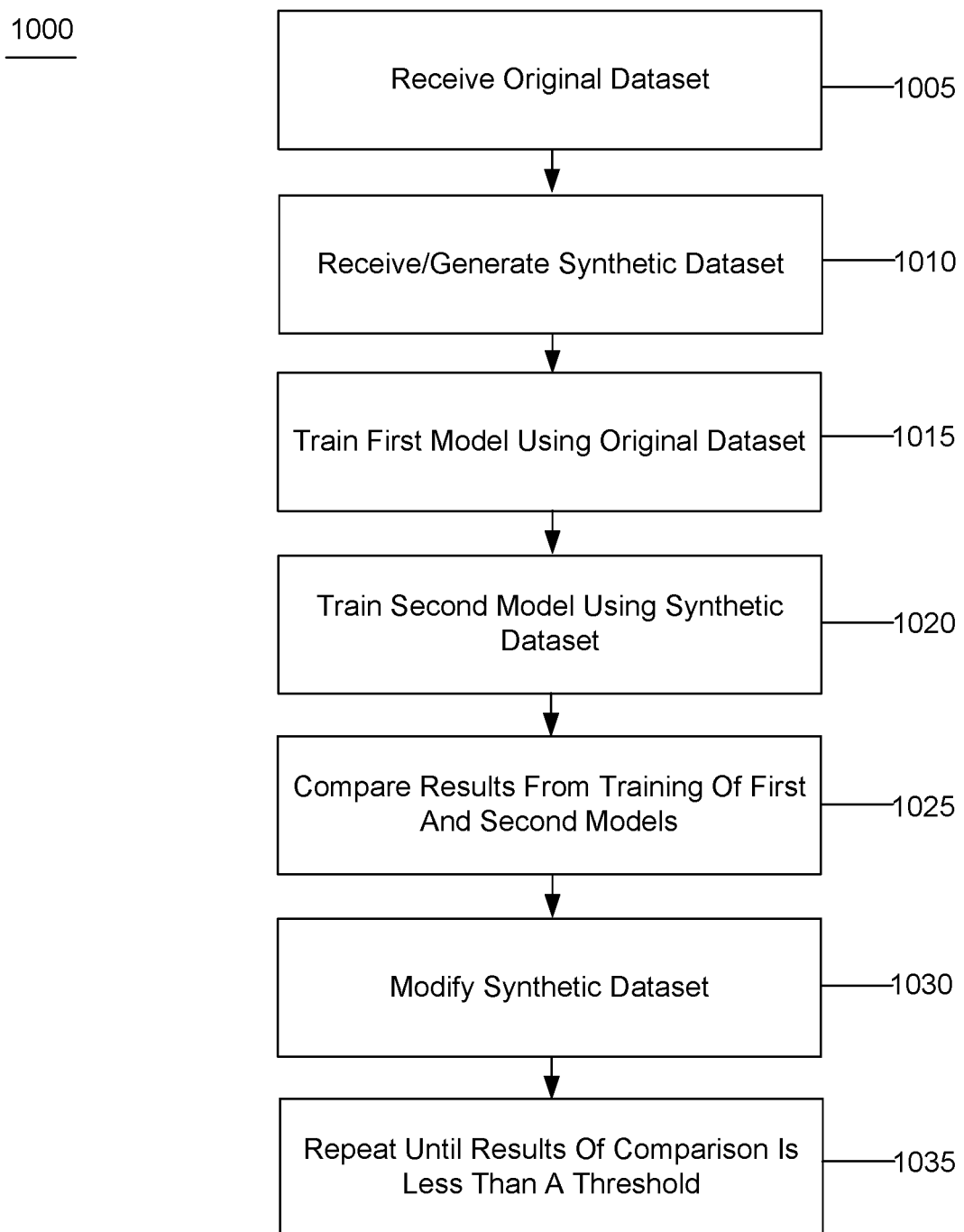

FIGS. 8-10 are exemplary flow diagrams of methods 800, 900, and 1000 for evaluating a synthetic dataset according to an exemplary embodiment of the present disclosure. For example, at procedure 805 in method 800, an original dataset can be received. At procedure 810, a synthetic dataset can be generated or received. At procedure 815, a first model can be trained using the original dataset and at procedure 820 a second model can be trained using the synthetic dataset. At procedure 825, the results from the training of the first model can be compared to the results from the training of the second model. These results can be evaluated at procedure 830. At procedure 835, a further synthetic dataset can be generated, which can be evaluated at procedure 840.

As shown in method 900 of FIG. 9, an original dataset can be received at procedure 905, which can be used to generate a synthetic dataset at procedure 910. At procedure 915, a first model can be trained using the synthetic dataset and at procedure 920 a second model can be trained using a second dataset. At procedure 925, the synthetic dataset can be evaluated, and a further synthetic dataset can be generated at procedure 930 depending on the evaluation. At procedure 935, the further synthetic dataset can be trained on the second model, and the further synthetic dataset can be evaluated at procedure 940.

As shown in method 1000 from FIG. 10, an original dataset can be received at procedure 1005. At procedure 1010, a synthetic dataset can be generated or received. At procedure 1015, a first model can be trained on the original dataset and at procedure 1020 a second model can be trained on the second dataset. At procedure 1025, the results from the training of the first model can be compared to the results from the training of the second model. At procedure 1030, the synthetic dataset can be modified for further evaluation. These procedures can be repeated until a sufficiency threshold for the synthetic dataset is met (e.g., the statistical correlation of the synthetic data to the original data).

Figure 11:
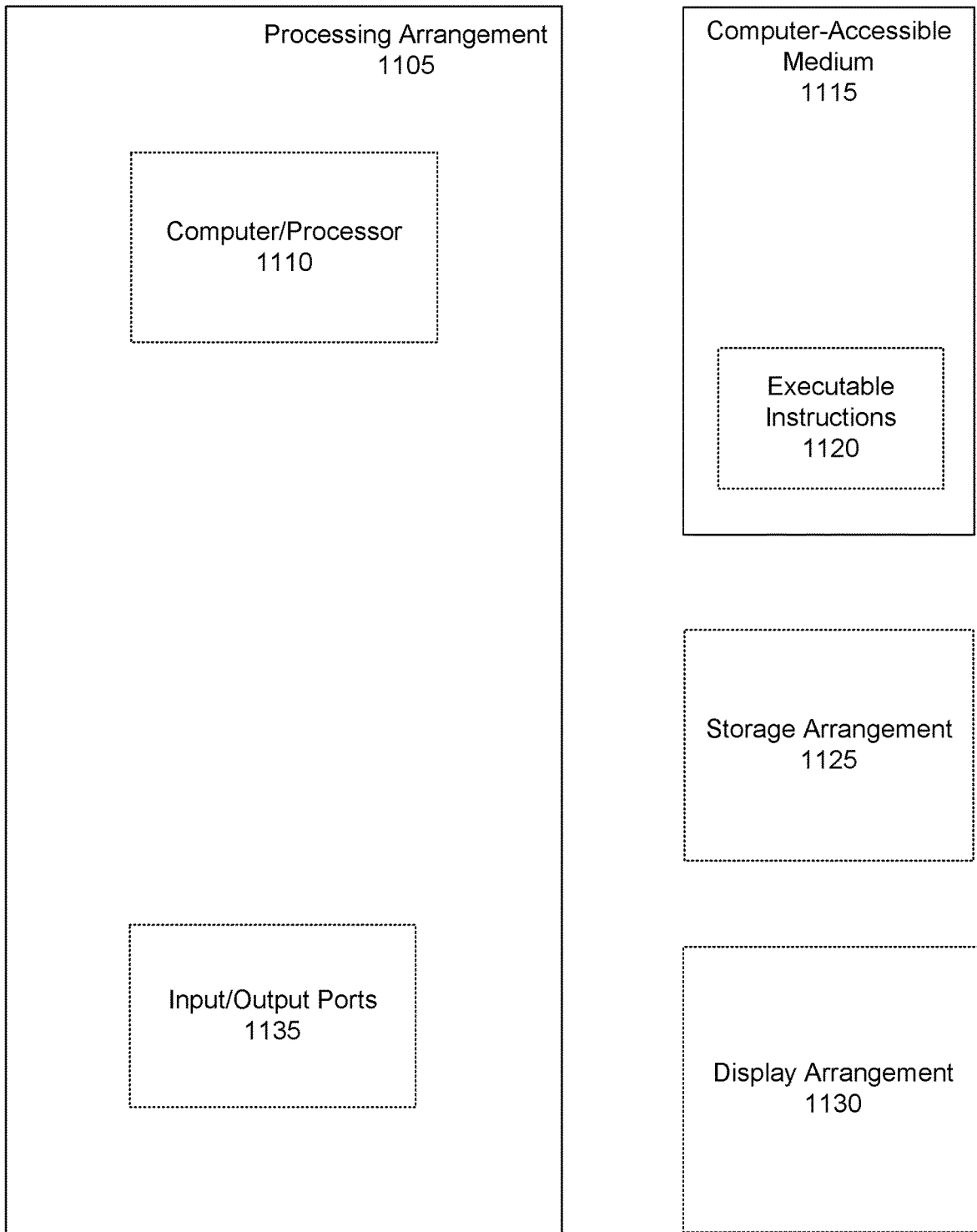
FIG. 11 is an illustration of an exemplary block diagram of an exemplary system in accordance with certain exemplary embodiments of the present disclosure.

FIG. 11 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1105. Such processing/computing arrangement 1105 can be, for example entirely or a part of, or include, but not limited to, a computer/processor 1110 that can include, for example one or more microprocessors, and use instructions stored on a computer-accessible medium (e.g., RAM, ROM, hard drive, or other storage device).

As shown in FIG. 11, for example a computer-accessible medium 1115 (e.g., as described herein above, a storage device such as a hard disk, floppy disk, memory stick, CD-ROM, RAM, ROM, etc., or a collection thereof) can be provided (e.g., in communication with the processing arrangement 1105). The computer-accessible medium 1115 can contain executable instructions 1120 thereon. In addition or alternatively, a storage arrangement 1125 can be provided separately from the computer-accessible medium 1115, which can provide the instructions to the processing arrangement 1105 so as to configure the processing arrangement to execute certain exemplary procedures, processes, and methods, as described herein above, for example.

Further, the exemplary processing arrangement 1105 can be provided with or include an input/output ports 1135, which can include, for example a wired network, a wireless network, the internet, an intranet, a data collection probe, a sensor, etc. As shown in FIG. 11, the exemplary processing arrangement 1105 can be in communication with an exemplary display arrangement 1130, which, according to certain exemplary embodiments of the present disclosure, can be a display in communication with an input device or a touchscreen configured for inputting information to the processing arrangement in addition to outputting information from the processing arrangement, for example. Further, the exemplary display arrangement 1130 and/or a storage arrangement 1125 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for evaluating at least one synthetic dataset, wherein, when a computer arrangement executes the instructions, the computer arrangement is configured to perform procedures comprising:

receiving at least one original dataset;

receiving the at least one synthetic dataset;

training at least one model using the at least one original dataset and the at least one synthetic dataset;

generating a statistical correlation score based on the at least one synthetic dataset and the at least one original dataset;

generating an evaluation score by evaluating the at least one synthetic dataset based on the training of the least one model, wherein the evaluation score includes (i) a statistical correlation score, (ii) a data similarity score, and (iii) a data quality score;

determining a region for the at least one synthetic dataset based on the evaluation score, wherein the region includes one of (i) a normal region where the at least one synthetic dataset is unlikely to contain synthetic data that is similar to original data within the at least one original dataset, (ii) a warning region where the at least one synthetic dataset potentially contains the synthetic data that is similar to the original data, or (iii) a red flag region where the at least one synthetic dataset is likely to contain the synthetic data that is similar to the original data; and generating a suggestion based on the evaluation score and the determined region, wherein the suggestion includes one of (i) indicating that the at least one synthetic dataset is adequate or (ii) warning that the at least one synthetic dataset potentially contains information similar to the at least one original dataset.

2. The computer-accessible medium of claim 1, wherein the at least one model includes a first model and a second model, and wherein the computer arrangement is further configured to:

train the first model using the at least one original dataset; and train the second model using the at least one synthetic dataset.

3. The computer-accessible medium of claim 2, wherein the computer arrangement is configured to evaluate the at least one synthetic dataset by comparing first results from the training of the first model to second results from the training of the second model.

4. The computer-accessible medium of claim 3, wherein the computer arrangement is configured to compare the first results to the second results using an analysis of variance procedure.

5. The computer-accessible medium of claim 2, wherein the computer arrangement is configured to compare the first results to the second results using a threshold procedure.

6. The computer-accessible medium of claim 5, wherein the threshold procedure includes:
  summing first errors from the first results;
  summing second errors from the second results; and
  comparing the summed first errors to the summed second errors.

7. The computer-accessible medium of claim 6, wherein the computer arrangement is configured to compare the summed first errors to the summed second errors using a threshold criterion.

8. The computer-accessible medium of claim 5, wherein the threshold procedure includes determining a further statistical correlation based on a plurality of covariance matrices.

9. The computer-accessible medium of claim 2, wherein the first model is equivalent to the second model.

10. The computer-accessible medium of claim 1, wherein the at least one model is a classification model.

11. The computer-accessible medium of claim 1, wherein the computer arrangement is further configured to generate the at least one synthetic dataset.

12. The computer-accessible medium of claim 11, wherein the computer arrangement is configured to generate the at least one synthetic dataset based on the at least one original dataset.

13. The computer-accessible medium of claim 1, wherein the computer arrangement is further configured to generate at least one further synthetic dataset based on (i) the at least one synthetic dataset and (ii) the evaluation of the at least one synthetic dataset.

14. The computer-accessible medium of claim 1, wherein the at least one original dataset and the at least one synthetic dataset include at least one of (i) biographical information regarding a plurality of customers or (ii) financial information regarding the plurality of customers.

15. A method for evaluating at least one synthetic dataset, comprising:
  (a) receiving at least one original dataset;
  (b) generating the at least one synthetic dataset based on the at least one original dataset;
  (c) training at least one first model using the at least one original dataset;
  (d) training at least one second model using the at least one synthetic dataset;
  (e) generating a statistical correlation score based on the at least one synthetic dataset and the at least one original dataset
  using a computer arrangement, generating an evaluation score by evaluating the at least one synthetic dataset based on the training of the least one first model and the training of the at least one second model, wherein the evaluation score includes (i) a statistical correlation score, (ii) a data similarity score, and (iii) a data quality score;
  determining a region for the at least one synthetic dataset based on the evaluation score, wherein the region includes one of
    (i) a normal region where the at least one synthetic dataset is unlikely to contain synthetic data that is similar to original data within the at least one original dataset,
    (ii) a warning region where the at least one synthetic dataset potentially contains the synthetic data that is similar to the original data, or
    (iii) a red flag region where the at least one synthetic dataset is likely to contain the synthetic data that is similar to the original data; and
  generating a suggestion based on the evaluation score and the determined region, wherein the suggestion includes one of (i) indicating that the at least one synthetic dataset is adequate or (ii) warning that the at least one synthetic dataset potentially contains information similar to the at least one original dataset.

16. The method of claim 15, further comprising generating at least one further synthetic dataset based on the evaluation score and the at least one synthetic dataset.

17. The method of claim 16, further comprising training the at least one second model based on the at least one further synthetic dataset.

18. The method of claim 17, further comprising evaluating the at least one further synthetic dataset based on the training of the at least one second model on the at least one further synthetic dataset.

19. A system, comprising:
  a computer hardware arrangement configured to:
    (a) receive at least one original dataset;
    (b) receive at least one synthetic dataset related to the at least one original dataset;
    (c) train at least one first model using the at least one original dataset;
    (d) train at least one second model using the at least one synthetic dataset;
    (e) generate a statistical correlation score based on the at least one synthetic dataset and the at least one original dataset;
    (f) generate an evaluation score by comparing first results from the training of the first model to second results from the training of the second model, wherein the evaluation score includes (i) a statistical correlation score, (ii) a data similarity score, and (iii) a data quality score;
    (g) determine a region for the at least one synthetic dataset based on the evaluation score, wherein the region includes one of
      (i) a normal region where the at least one synthetic dataset is unlikely to contain synthetic data that is similar to original data within the at least one original dataset,
      (ii) a warning region where the at least one synthetic dataset potentially contains the synthetic data that is similar to the original data, or
      (iii) a red flag region where the at least one synthetic dataset is likely to contain the synthetic data that is similar to the original data; and
    (h) generate a suggestion based on the evaluation score and the determined region, wherein the suggestion includes one of (i) indicating that the at least one synthetic dataset is adequate or (ii) warning that the at least one synthetic dataset potentially contains information similar to the at least one original dataset;

(i) modify the at least one synthetic dataset based on the comparison; and
(j) repeat procedures (d)-(f) until the comparison of the first results to the second results is less than a particular threshold.

20. The system of claim 19, wherein the computer arrangement is configured to compare the first results with the second results using an analysis of variance procedure.

\* \* \* \* \*